Aug. 25, 1964   C. B. MITCHELLA ETAL   3,146,148
APPARATUS FOR FABRICATING COMPOSITE STRUCTURES
Filed Nov. 8, 1957   2 Sheets-Sheet 1
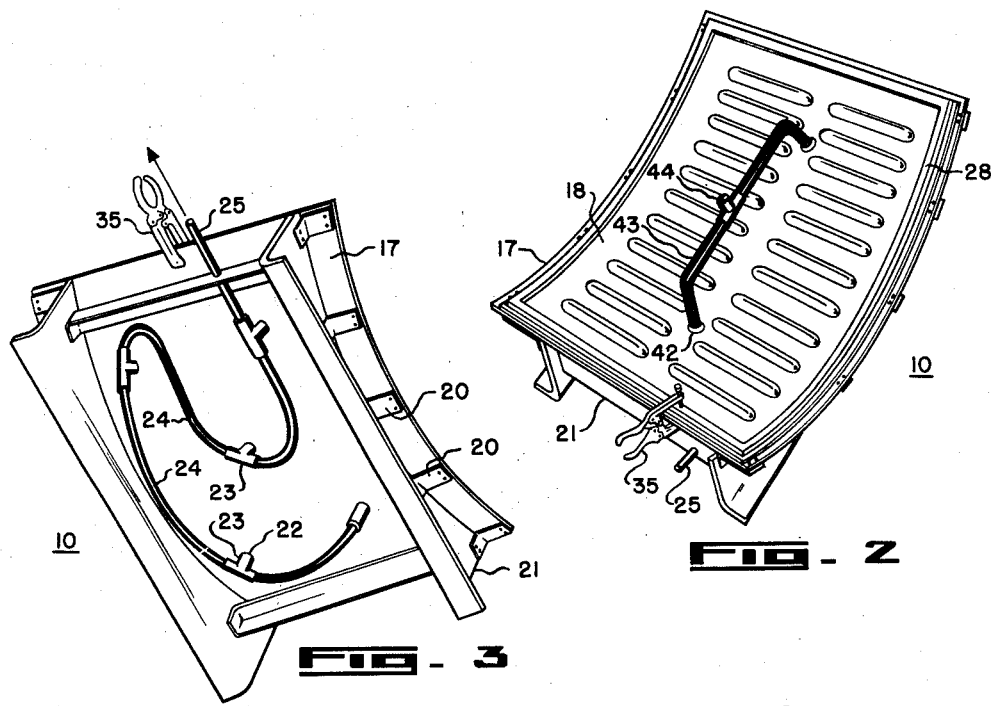
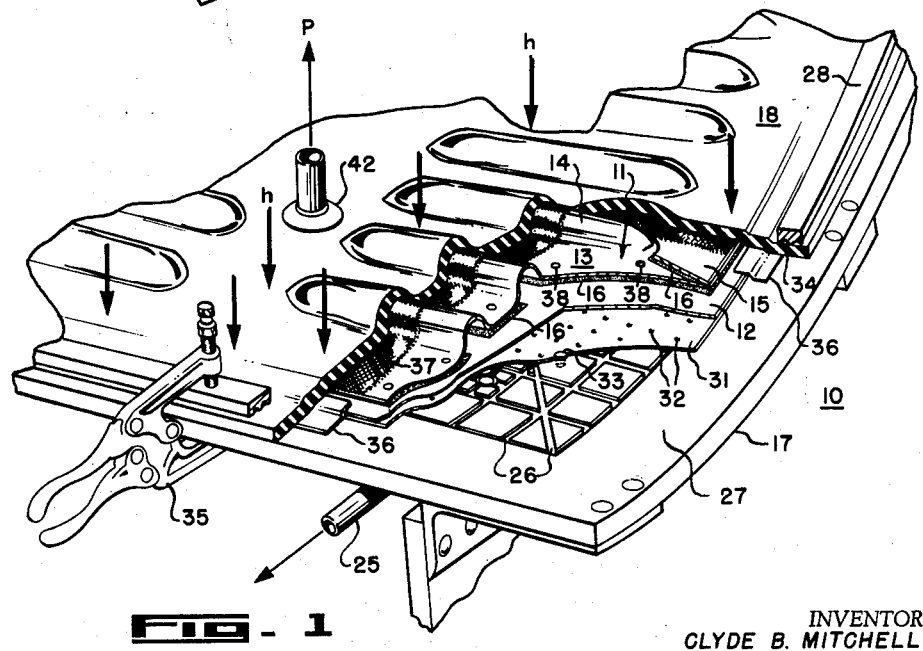
INVENTORS
CLYDE B. MITCHELLA
WITHROE L. J. WILLIAMS
BY
ATTORNEY Aug. 25, 1964     C. B. MITCHELLA ETAL     3,146,148
APPARATUS FOR FABRICATING COMPOSITE STRUCTURES
Filed Nov. 8, 1957                           2 Sheets-Sheet 2
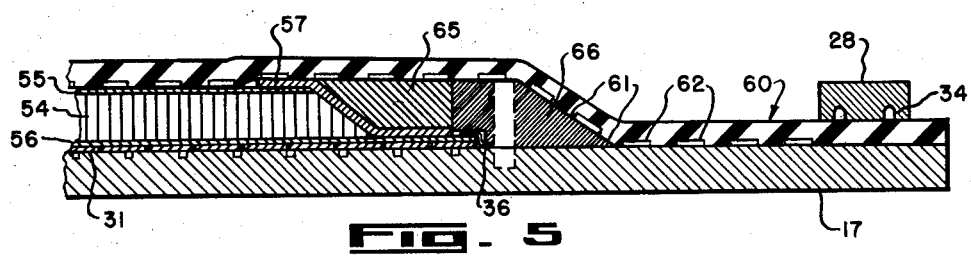
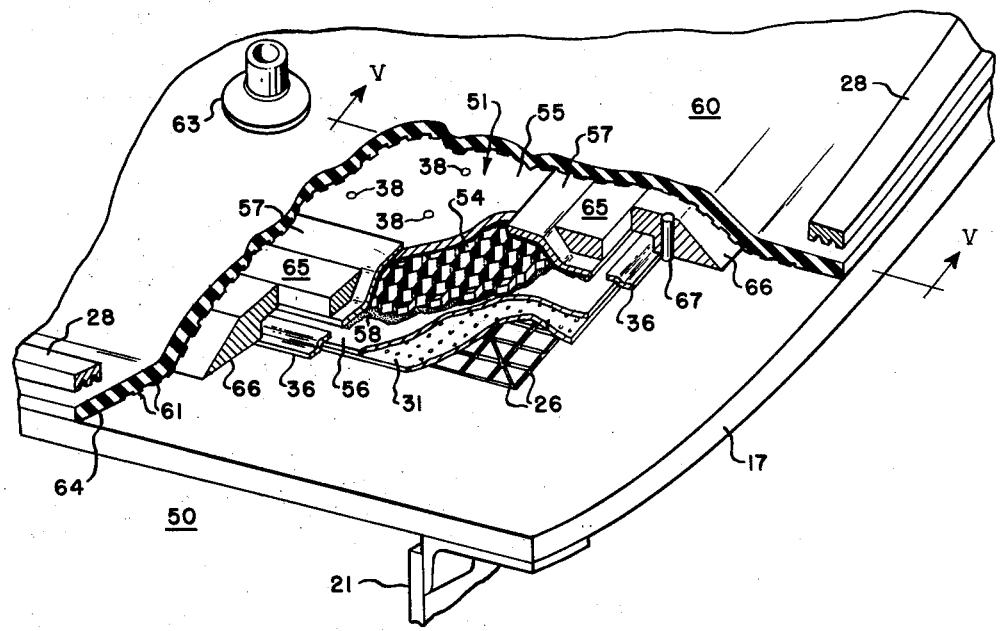
INVENTORS
CLYDE B. MITCHELLA
WITHROE L. J. WILLIAMS
BY
ATTORNEY

United States Patent Office 3,146,148
Patented Aug. 25, 1964

3,146,148
APPARATUS FOR FABRICATING COMPOSITE STRUCTURES
Clyde B. Mitchella and Withroe L. J. Williams, Fort Worth, Tex., assignors to General Dynamics Corporation, San Diego, Calif., a corporation of Delaware
Filed Nov. 8, 1957, Ser. No. 695,350
3 Claims. (Cl. 156—382)

The present invention relates generally to an apparatus for the adhesive bonding together of component elements into a composite structure and more particularly to a novel method and apparatus for maintaining assembled component elements in their prefitted, and precise, associated relationship and for simultaneously applying controlled pressure and heat to the assembly throughout the bonding cycle.

Structural materials employed in present day aircraft and missiles are subjected to severe and varying stresses and must necessarily exhibit structural integrity of a very high order before they can be accepted for such use. Consequently, all adhesive bonds between such materials must be of such excellent character that they will have the capability of resisting or withstanding varying stress loads of substantial magnitude while simultaneously being subjected to extremes of hot or cold environment.

Heretofore adhesively bonded metallic structures of the above general character could only be assembled and bonded by relatively slow, cumbrous and inefficient methods. Further, such methods were deficient because only certain perfunctory controls of heat and pressure distribution could be effected and there was no provision of an adequate medium for the escapement of air and the volatile gases given off by the adhesives under heat. Such insufficiencies had a deleterious effect upon the integrity of the resulting adhesive bond in that varying heat and pressure applications produced inherent inconsistencies in degree of bond strength. Further, trapped volatile gases often prevented adhesion in the areas where such gases were trapped, thus resulting in adhesion voids in these areas. Conventional fixtures employed in known metal bonding processes are massive, heavy and cumbersome to the workman; they entail expensive tooling procedures, fabrication and maintenance, since each fixture can be used only a few times and, because of distortion and warpage under the magnitude of the heat and pressures to which they are subjected, must then be reworked or scrapped. Obviously such implements are not amenable to the demands of mass production since they require an excessive amount of preparational "set-up" time; thereby making the production of such assemblies a comparatively slow and expensive process.

The present invention extends to the use of a cincture-like matrix which affords a composite implement which is well adapted to overcome the aforementioned deficiencies. It is inherently a comparatively lightweight and compact construction, requiring only relatively simple tooling procedures; is easily and economically manufactured and may be adequately maintained in good working order with a minimum of effort.

Further, the improvements that reside in the present invention effectively decrease the quantity of re-work heretofore required on individual assemblies and decrease the number of rejections due to uneven bonding, because a more nearly uniform pressure distribution is effected on all faying surfaces; thus, generally adapting the present metal bonding process to mass production modes by increasing the actual production of bonded panel parts.

The present cincture-matrix implement is unaffected by high heat and continuing changes in temperature. Warpage or rough usage does not materially affect the inherent precision qualities of the implement, and it may be readily enshrouded over various types and configurations of production parts, whether such parts be substantially flat or compoundly contoured. Furthermore, since the present cincture-matrix embodies a perforated platen as a component part, the sheet metal face or skin element of a composite panel assembly need not be marred by slight surface irregularities, such as undulatory effects induced by the vacuum pull over the grooves of the gridded baseplate.

Accordingly, the primary object of the present invention is to provide a novel implement for the adhesive bonding together of the component elements of a composite panel assembly, that is well adapted to achieve an end product of exceptional structural integrity.

Another object of the invention is to provide an improved bonding implement, which is in the form of a cincture-matrix, for the pressure/heat bonding together of metal components, by the employment of metal adhesives, and which is adapted to effect consistent and evenly distributed bonding pressures over all faying surfaces of the object workpiece.

A further object of the invention is to provide an apparatus of the above class and character that is so constructed that volatile gases and air, that might otherwise be entrapped and cause voids to form in the adhesive joint of the workpiece, may be effectively evacuated therefrom.

Still another object of the invention is the provision of a metal bonding implement wherein panel components may be held together, in the intended precise, close tolerance relationship, for purposes of bonding one to the other, thereby eliminating the necessity for conventional "set-up" fasteners, such as tack-riveting, and extraneous locators, and, thus, permitting increased accuracy in assembly and production efficiency to be realized.

A still further object resides in the provision of a metal bonding implement that may be easily and economically fabricated by conventional production tooling techniques; is lightweight and compact in construction; unaffected by heat or frequent and continuing abrupt changes in temperature; will retain specified accuracy and precision qualities under warpage conditions or hard usage; requires only a minimum amount of maintenance and is capable of being enshrouded as a resilient mold over substantially any type or configuration of production part.

Other objects and features of the present invention will be readily apparent to those skilled in the art from the following specification and appended drawings wherein is illustrated a preferred form of the invention, and in which:

FIGURE 1 is a perspective view, partially cut away, showing a cincture-matrix embodying the invention, and exemplifying a typical application to a metal bonded panel assembly.

FIGURE 2 is an over-all perspective view of the cincture-matrix of FIGURE 1 and shows an edge-sealed blanket or shroud, as resiliently molded by vacuum, over the contoured configuration of a metal bond beaded panel which is assembled in a cradle-type base form and also shows a dual-orificed vacuum conduit manifold for evacuation of the area between the resilient blanket and the upper surface of the panel to be bonded.

FIGURE 3 is a bottom view of the cincture-matrix of FIGURE 2.

FIGURE 4 is a perspective view, partially cut away, illustrating a second embodiment of the invention adapted for bonding a cellular cored, sandwich type, metal bond panel construction.

FIGURE 5 is a sectional view taken along line V—V of FIGURE 4.

A cincture-matrix bonding implement embodying the present invention is indicated generally in the drawings by the numeral 10 and is exemplified in connection with the pre-fitted and assembled components of a typical composite structural panel 11 (FIGURE 1). Panel 11 comprises an outer face or skin 12, an inner sheet metal element 13 which is formed with a plurality of integral stiffener beads 14, and doubler reinforcing members 15; all of which are to be adhesively bonded, one to the other, into a fixed unit by means of a suitable metal bonding adhesive, which is disposed between the faying surfaces of the individual components and may be applied as a layer or in conventional tape form as indicated at 16. The adhering together of the components is effected by the application of high pressure $h$ and heat to the assembly, such as may be accomplished in a usual industrial autoclave or other suitable conventional pressure vessel (not shown). The particular composition of the adhesive used forms no part of the present invention as this invention contemplates the use of any suitable commercially available adhesive.

It is understood that panel 11 is merely illustrative of metal bonded composite panels which may be achieved with the present invention. This invention contemplates that the panels may be of various sizes, shapes, and configurations and, of course, vary as to the number of individual components in a panel. Metal bonded panels are conventionally employed as component aircraft structural parts and are contiguously fitted together in the construction of an airframe fuselage, empennage, wing or the like. Metal bonded panels are very desirable as aircraft and missile structural parts since they exhibit a very high strength to weight ratio. Further, excellent rigidity is achieved without increasing density or mass, and they possess excellent damping characteristics against high frequency aircraft vibrations which produce metal fatigue. Further, as contrasted to conventional fastening means, such as rivets, bolts, etc., which engender stress concentrations thereabout, adhesively bonded joints inhibit metal fatigue by their inherent ability to evenly distribute stress loads to all areas of the joining surfaces.

Cincture-matrix bonding implement 10 comprises two major and several auxiliary elements, with metal base plate 17 and resilient shroud or blanket 18 being the major elements thereof. The function of resilient shroud 18 is to retain the component elements or detail parts 12, 13 and 15 of the panel section composite assembly 11 in place in their predetermined exact relationship, one to the other and to apply cincturing pressure to all faying or wetted surfaces of the assembly until the cycle of heat induced curing of the adhesives is completed and the desired bond achieved.

Shroud 18 may be made of any suitable elastomeric or rubber-like material, such as silicone rubber, which is capable of withstanding the high temperatures and pressures employed in metal bonding and which is of such character that it will remain resilient after sustained exposure to cyclic heating and cooling and not become brittle or lose its elastic properties nor tend to take a permanent set to the configuration of parts being bonded.

Bonding form base plate 17 may be constructed from any suitable metal that is relatively unaffected by the heating/cooling bonding cycle and that will not be easily warped or otherwise distorted thereby. In the preferred form of the invention a 75ST aluminum plate of approximately .250 inch thickness is employed. This plate 17 is rolled to the contour of the composite panel which is to be bonded and is fitted to a cradle-like supporting framework 21, to which it is attached by means of structural angles 20, which are riveted or otherwise suitably fastened in place. A plurality of apertures 22, preferably approximately one to each square foot of area, are provided in base plate 17, and into which are inserted usual vacuum fittings 23 (FIGURE 3). Fittings 23 are interconnected by suitable conduits 24, to form a manifold arrangement for evacuation at a common point through a conduit 25 (FIGURES 1 and 3) which is suitably connected to a vacuum pump (not shown). Preferably the upper face of base plate 17 is provided with a plurality of relatively shallow grooves 26, in a pattern of grid lines or a functional equivalent thereof, in order to assure that air or gases, being evacuated from the upper surface of this base plate, will have adequate orificing to permit unhampered flow to the vacuum fittings 23 and thence to point of evacuation 25, and beyond. However, should only local grooving be afforded in the immediate vicinity of each aperture or orifice 22, or should there be no grooving at all, it is not to be construed as departing from the scope of the present invention, since even though grooving has been shown to be desirable for improving vacuum control, in degree, local grooving or lack of grooving does not impair the operation of the present device as to prevent the obtaining of a satisfactorily bonded panel 11. In order to permit the application of edge sealing to the upper face of base plate 17, when grooving is employed such grooving is not extended into the peripheral area 27 of base plate 17, since it is necessary, as will be described subsequently, to employ a clamped "picture-frame" tie-down bar 28, about the peripheral edges of shroud 18 and base plate 17 to prevent the passage of air therebetween and thus destroy the vacuum effect.

Overlaying the grooved area of base plate 17, and extending slightly beyond the outer groove and onto peripheral area 27, is a perforated sheet or vacuum cover 31. Preferably vacuum cover sheet 31 is made of aluminum alloy material; being of proportionately thin gauge sheet stock when compared to that of plate 17, and in the presently illustrated instance, on the order of .064" gauge thickness. Perforations 32, provided in vacuum cover sheet 31, are rather closely spaced, approximately .5" x 1" spacing, and are generally small in diameter, approximately drill size No. 40 (.0980") to No. 51 (.0670"). Further, these perforations 32 are coordinated with the grid pattern of grooves 26 in such manner that each grooved grid line will have linearly dispersed perforations immediately above it. Attachment of perforated sheet 31 to grooved base 17 is effected by a plurality of rivet pins or other suitable fasteners 33; this attachment serves to locate and hold sheet 31 in its proper position in respect to base plate 17 and to the other elements of the cincture-matrix implement. The primary function of perforated sheets 31 is to create sieving action for pulling the gases and air being evacuated from between outer face sheet 12 of the panel 11, and base plate 17, thus dispersing the vacuum suction effect over myriad minute areas upon face sheet 12, and thereby exerting a dense, uniform total pulling force. Distortion of facing sheet 12, such as from locally alternating elevations and depressions or undulating fluctuation of the surface, as would otherwise occur, is substantially eliminated, since the small diameter of any single area being pulled, as related to the mass or volume of material exposed to the vacuum force, is of sufficient high ratio as to preclude all but very negligible distortion of the surface. Thus, substantial aerodynamic smoothness of the outer face of the panel is effectively preserved.

Overlaying and completely covering the assembled elements 12, 13, 15 and adhesive tapes or layers 16, which comprise composite bonded panel 11, is the resilient bonding blanket or shroud 18, heretofore mentioned. Shroud 18 extends beyond the perimeter of composite panel 11, preferably to the extent that the edges thereof coincide with the peripheral edges of base plate 17; thus, ungrooved peripheral area 27 affords a smooth, unbroken surface over which an encircling, "picture-frame" like tie-down bar 28 may be clamped. Bar 28 has one or more longitudinally machined grooves in its lower surface, such as shown at 34, the lands of which provide footing pressure against shroud 18 and thus assures a better seal between the upper face of base 17 and lower surface of shroud 18 by effecting greater displacement of the shroud's resilient material into said grooves. Conventional C clamps 35 or toggle clamps or other suitable clamping means, are employed for the application of sealing pressure to "picture-frame" tie-down bar 28, thus precluding pressure leaks between the edges of shroud 18 and base plate 17.

In order that panel facing or outer skin 12 may be effectively and uniformly drawn to and flattened against perforated vacuum cover sheet 31 when a vacuum is pulled through fittings 23 (FIGURE 3) and conduits 24 to the under side of base plate 17 (FIGURE 1), a tape seal 36 is provided about the entire peripheral edge of panel facing skin 12 and in contact with the upper, ungrooved peripheral edge area 27 of base plate 17. Thus, when the area between the lower surface of panel facing skin 12 and the upper face of base plate 17 is evacuated, no undesirable leakage of gas or air may take place from the area above panel facing 12 to the area below it.

Between shroud 18 and the beaded panel element 13 and the doublers 15 there is provided a suitable evacuation medium for air and volatile gases, this medium being in the form of a layer 37 of commercially available bleeder cloth. Bleeder cloth 37 is made of a woven fibrous material, preferably fibrous glass, to pass gases emitted by vent holes 38 in sheet 13.

Use of a fibrous glass material is desirable since it possesses excellent heat resistant properties, is chemically inert and generally retains its original physical form and character after being subjected to repeated cycles of heating, cooling and pressurization forces $h$.

The woven threads of such fibrous glass fabric provide a relatively firm and dense medium through which pressure forces $h$ applied to shroud 18 may be transmitted to the upper surface of beaded panel element 13, while simultaneously providing sufficient void to permit substantially all of the volatile gases and air to pass therethrough. Such gases and air are also made to pass to the exterior of shroud 18 through a pair of apertures provided in shroud 18 which accommodate fittings 42. Connecting fittings 42 is a conduit 43 (FIGURES 1 and 2) which leads such gases and air to a common point of evacuation at 44 (FIGURE 2), and beyond, in direction P, toward a usual vacuum pump (not shown).

Referring now to FIGURES 4 and 5, the invention is here exemplified in a second cincture-matrix embodiment 50. This embodiment 50 is adapted to bond together the component elements of a composite, cellular cored, sandwich panel construction 51. Generally, such type panel comprises a cellular or "honeycomb" like core 54, facing plates 55 and 56 and suitable edge-closure members 57, the facing plates and edge members being bonded by a suitable metal bonding adhesive, applied in a layer or tape form as at 58, to the core element to form the composite panel.

Embodiment 50, similarly to the first embodiment, includes base plate 17, cradle frame support 21 and perforated vacuum cover sheet element 31, whose construction and function are the same here as in the preferred embodiment of FIGURES 1, 2 and 3. Further, perforated sheet element 31 is here similarly sealed against inadvertent leakage by edge tape 36.

In this second embodiment, illustrated by FIGURES 4 and 5, a panel cincturing vacuum blanket or shroud 60 is employed which, similarly to shroud 18 above, is made of an elastomeric material which maintains its resilient character under conditions of sustained heating, cooling and pressure cycles; as in the first embodiment, this material may be a commercially available silicone rubber. Shroud 60 differs from shroud 18 in that it integrally embodies a medium for the dispersion and evacuation of air and volatile gases. This eliminates the necessity for the bleeder cloth or fabric element 37 shown in the embodiment of FIGURE 1. This integrated evacuation medium is achieved by molding a grid pattern of pressure pads 61 into the inner face of resilient shroud 60 (FIGURES 4 and 5). The purpose of this pressure pad pattern is to provide a means for transmission of bonding pressure to the elements being bonded and simultaneously provide for the evacuation of air and volatile gases. Evacuation is accomplished through channels formed by the areas 62 which surround pads 61, which channels are bled by a pair of fittings 63, one of which is shown in FIGURE 4. Fittings 63 serve the same purpose as fittings 42 of the first embodiment and permit air and volatile gases to flow from the enclosed work area to the exterior of shroud 60. A border area 64 of shroud 60 is provided devoid of pressure pads 61 in order that the entire periphery of the shroud may be sealed against pressure leakage by application of tie-down bar 28 thereagainst.

When it may be desirable to avoid an abrupt or severe break in contour of the shroud when abrupt irregularities in the parts being bonded are rather pronounced, filler blocks 65 and 66, conforming to the shape of the contour break, are provided. Such filler blocks fill in space, at what would otherwise be abrupt curvatures, and assure effective application of pressure at areas to be bonded. Shifting of the filler blocks is prevented as by use of pins 67 or other suitable fasteners passing through blocks 66 and into base plate 17.

In the operation of the invention, or functional application of the first cincture-matrix 10 for metal bonding, component elements 12, 13 and 15 (FIGURE 1), which have been pre-cut and pre-formed, are first assembled, in the exact relationship desired, into a conventional close tolerance assembly fixture (not shown). This is accomplished by placing outer facing sheet or skin 12 into said fixture within the confines of locator pins, clips or picture frame edge bars. Strips of the metal bond adhesive tape 16, which have been surface activated so that a tacky or sticky condition exists, are applied to the areas of inner beaded sheet element 13 and the latter's reinforcing doubler elements 15 which are to be bonded. This inner beaded sheet 13 is then adhered to facing sheet 12; its precise relationship or fit being controlled and assured by use of conventional tooling locator pins. Doublers 15 are next fitted into place in a similar manner and temporarily adhered to the inner surface of beaded element 13 by virtue of the tacky or sticky condition of adhesive tape 16. To further assure that no "creep" or slight relative movement, between component elements 12 and 13 or between elements 13 and 15, may inadvertently take place, tacking or spot bonding is normally the technique applied at this stage. This merely involves the local or spot application of heat, at various scattered points over the surfaces to be bonded, to the extent that partial setting or curing of the adhesive resin is effected at that point only. Thus, such points serve to rigidly secure or tack the respective elements together so that subsequent removal from the assembly fixture and other pre-bond handling cannot result in slight slippages or relative movement between the assembled parts.

At this stage, the pre-assembled composite panel 11 is placed upon base plate 17 to over-lie perforated sheet 31 which is inserted and positioned between the lower surface of outer panel skin 12 and the upper surface of base plate 17. Close tolerance positioning is effected by the employment of conventional tooling devices, such as peripheral metal locator strips, locator pins, locator angles or scribed lines (not shown). All peripheral edges of the panel facing sheet 12 and perforated vacuum sheet 31 are then sealed against leakage by application of sealing tape 36 thereabout. Bleeder cloth 37 is next spread over the beaded facing sheet element 13 and doublers 15, with the peripheral edges thereof approximately coinciding with like edges of the beaded facing sheet, in order that all areas immediately over the upper surfaces of these elements, and within the peripheral definition of sealing tape 36, may be afforded an evacuation medium for dispersion of trapped air and the volatile gases that are given off by the curving adhesives, to a centralized point for removal.

The entire panel composite 11 is thereupon completely covered with the resilient shroud or vacuum blanket 18 which carries vacuum fittings 42 suitably manifolded by conduits 43. The peripheral edges of vacuum shroud 18 normally are fabricated so as to extend beyond sealing tape 36, fitted about the edges of outer facing sheet 12 and perforated vacuum sheet 31, a distance sufficient to accommodate grooved "picture-frame" tie-down bar 28 over the unscored area 27 of base plate 17. Suitable clamping means, such as toggle clamps 35, are applied to tie-down bar 28 with sufficient force that a portion of the resilient material immediately beneath the lands of said tie-down bar 28 is displaced into the grooves adjacent thereof, thus forming foot pressure sealing between the undersurface of the shroud 18 and the upper surface of the base plate 17 in area 27 thereof.

The bonding implement containing the composite panel to be bonded is now placed within an autoclave where predetermined heat and pressure will be applied. Upon being positioned within the autoclave, and prior to the closing thereof, connections are made between evacuation points 25 and 44 and suitable vacuum pumps (not shown) positioned externally of the autoclave. Conduit lines leading to the vacuum pumps from evacuation points 25 and 44 are suitably fitted and sealed where they pass through the walls of the autoclave. Before the pressure door of the autoclave is closed and locked, the vacuum pump connected to point 25 is started and maximum partial vacuum, which it has been found approaches 15 p.s.i., is drawn below panel facing sheet 12. Facing sheet 12 is thus drawn tightly into the contour defined by base plate 17 and perforated sheet 31 and is maintained in such flattened position throughout the bonding cycle to follow. The pressure door of the autoclave is thereupon closed, sealed and locked. The vacuum pump connected to point 44 is now turned on and a maximum partial vacuum (also approaching 15 p.s.i.) is thereby effected in the entire area defined by the "picture-frame" tie-down bar 28 and between the lower surface of shroud 18 and the upper face of edge sealed panel sheet 12. With full vacuum being drawn both below and above panel composite 11, the autoclave is set to begin pressurization toward the required magnitude, which, it has been found, may be in the order of 200 p.s.i. Inasmuch as the area between the vacuum shroud 18 and base plate 17 has been practically evacuated, a substantial pressure differential exists between the shrouded area and the bonding implement's ambient atmosphere within the autoclave. Therefore, it is now possible that the full effect of the pressurization force being created within the autoclave, may be transmitted directly to the faying surfaces of the components to be bonded together. Heat is now generated within the autoclave in the conventional manner and the pressurized atmosphere, ambient to the bonding implement and composite panel contained therein, is subjected to sufficient heat so as to set or cure the resinous metal bonding adhesive 16. As adhesive 16 cures, volatile gases are released from the resinous ingredients thereof. In order to prevent such gases from collecting in pockets and causing voids to form within the bond line, they must be drawn off, collected at centralized points and removed from both the panel and autoclave. This is accomplished by the provision of the suitably spaced venting holes 38 that pass through inner panel facing 13 (FIGURE 1). The vacuum force thus draws such volatile gases through evacuating bleeder cloth 37 (FIGURE 1) thence to and through the nearest vacuum fitting 42 into conduit 43 and on to evacuation point 44 (FIGURE 2) and finally through a suitable conduit to subsequent removal outside the autoclave.

Upon completion of the pressure/heat curing cycle, the cincture-matrix implement, containing the now permanently integrated composite panel, is removed from the autoclave and permitted to cool. However, both top and bottom vacuum pressure is maintained until the implement and its contained panel cool to room temperature in order to preclude warping, buckling or creepage of the panel due to rapid cooling. After proper cooling time has elapsed both top and bottom vacuums are released; the cincture-matrix "picture-frame" tie-down bar 28 released and the shroud 18 is removed. Tape 36 having been peeled away, the finished, bonded composite panel is extracted from base plate 17 ready for use.

The operation to effect the bonding of composite panel 51 through use of the cincture-matrix 50 is the same as above described in connection with matrix 10 for bonding of composite panel 11.

Thus, the facing plates 55 and 56, core 54 and edge closure 57 are pre-assembled in desired relationship, placed upon base plate 17 and vacuum sheet 31, and sealed at the edges by the sealing tape 36. Shroud 60 with its grid pattern of pads 61 is laid over the assembled components and its peripheral edges are pressed against base plate 17 by tie-down bar 28 and clamps 35. The cincture-matrix 50 is then placed in an autoclave and a vacuum drawn above and below the composite panel, just as in the first embodiment. Heat is then applied to cure the adhesive. The volatile gases released in this curing are drawn by a vacuum force from the core area to the channels of shroud 60 through minute venting apertures (not shown) present in the walls of each cell of the core 54 and through vent holes 38 provided in facing sheet 55. Shroud 60 with its integral grid on its underface channels the gases to fittings 63 from which they are drawn through suitable conduits to a point outside the autoclave.

After the curing cycle, the matrix 50 and the composite panel 51 are removed from the autoclave and cooled while maintaining a vacuum. Thereafter the tie-down bar 28, shroud 60 and tape 36 are removed and the composite panel 51 is ready for use.

The invention is exemplified by an implement device, whereby metal components of a composite panel structure may be held together and restrained in an exact, predetermined relationship, each to the other, while heat and pressure are simultaneously applied and thus, through the employment of a metal adhesive, effect a metal to metal bond of high strength and excellent structural integrity.

As thus described, the cincture-matrix metal bonding implement of the present invention is characterized as an improved composite unit, having the several novel features heretofore described, which is well adapted to effect a superior metal to metal bonding, between several component elements, into an integrated composite panel assembly which exhibits exceptional structural integrity when subjected to severe and varying stresses while simultaneously exposed to extremes of heat or cold.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. Apparatus for fabricating a composite structure formed of component elements adapted to be adhesively bonded together under heat and pressure, said apparatus comprising a base having a supporting face, a perforated sheet member mounted on said supporting face for carrying the component elements of the composite structure, vacuum fitting means inserted through said base and adapted for connection to a pump for the drawing of a vacuum at the face of said sheet member, an enclosing shroud of resilient material for fitting over work carried by said supporting face, said shroud having a plurality of pressure pads formed upon a portion of the area of its underside, said pressure pads being separated by intercommunicating passageways, said shroud having a peripheral smooth-surface area surrounding said area having said pressure pads, means for releasably, sealably affixing said smooth-surface portion of said shroud to said supporting base, and vacuum fitting means inserted through said shroud in communication with said passageways and adapted for connection to a pump for the drawing of a vacuum beneath said shroud.

2. Apparatus for fabricating a composite structure formed of component elements adapted to be adhesively bonded together under heat and pressure, said apparatus comprising a base having a supporting face, said supporting face having a plurality of intercommunicating grooves formed in a portion of the surface area thereof, said grooved surface area portion being surrounded by a smooth-surface peripheral area, a perforated sheet vacuum member overlying said grooved surface area for carrying the component elements of the composite structure, vacuum fitting means inserted through said base in communication with said grooves and adapted for connection to a pump for the drawing of a vacuum at the face of said sheet vacuum member, an enclosing shroud of resilient material for fitting over work disposed on said perforated sheet, said shroud having a plurality of integral pressure pads formed upon a portion of the area of its underface, said pressure pads being separated by intercommunicating passageways, said shroud having a peripheral smooth-surface area surrounding said area having said pressure pads, means for releasably, sealably affixing said smooth-surface portion of said shroud to said supporting base at the smooth-surfaced peripheral area thereof, and vacuum fitting means positioned through said shroud in communication with said passageways and adapted for connection to a pump for the drawing of a vacuum beneath said shroud.

3. Apparatus for fabricating a composite structure formed of component elements adapted to be adhesively bonded together under heat and pressure, said apparatus comprising a base plate having a supporting face substantially conforming in contour to the surface of the workpiece to be placed on the base plate, said supporting face having a plurality of intercommunicating grooves formed, and arranged in a grid pattern, in the portion of the surface area of said supporting face, said grooved surface area being surrounded by a smooth-surfaced peripheral area, a perforated sheet vacuum member having the contour of said supporting face affixed to said supporting face and overlying said grooved surface area, vacuum fitting means inserted through said base in communication with said grooves and adapted for connection to a pump for the drawing of a vacuum at the face of said sheet vacuum member, an enclosing shroud of resilient material for fitting over work disposed on said perforated sheet, said shroud having a plurality of integral pressure pads formed upon a portion of the area of its underface, said pressure pads being separated by intercommunicating passageways, said shroud having a peripheral smooth-surface area surrounding said area having said pressure pads, means for releasably, sealably affixing said smooth-surface portion of said shroud to said supporting base at the smooth-surfaced peripheral area thereof, and vacuum fitting means inserted through said shroud in communication with said passageways and adapted for connection to a pump for the drawing of a vacuum beneath said shroud.

References Cited in the file of this patent
UNITED STATES PATENTS

| | | |
|---|---|---|
| 1,949,159 | Glidden et al. | Feb. 27, 1934 |
| 1,949,275 | Heintz | Feb. 27, 1934 |
| 2,351,058 | Marks | June 13, 1944 |
| 2,354,916 | Hurt | Aug. 1, 1944 |
| 2,376,805 | Peacock | May 22, 1945 |
| 2,446,771 | Knowland | Aug. 10, 1948 |
| 2,513,785 | Browne | July 4, 1950 |
| 2,700,632 | Ackerlind | Jan. 25, 1955 |
| 2,713,378 | Nadler et al. | July 19, 1955 |
| 2,722,962 | Hampshire et al. | Nov. 8, 1955 |
| 2,747,180 | Brucker | May 22, 1956 |
| 2,755,216 | Lemons | July 17, 1956 |
| 2,782,574 | Copold | Feb. 26, 1957 |
| 2,863,491 | Adams | Dec. 9, 1958 |
| 2,978,806 | Herbert | Apr. 11, 1961 |
| 2,983,638 | Quehl | May 9, 1961 |

OTHER REFERENCES

"It's in the Bag," The Petroleum Engineer, November 1945, pp. 240 and 242.